United States Patent [19]

Bertaud

[11] 3,797,609

[45] Mar. 19, 1974

[54] LUBRICATING METHOD AND APPARATUS
[75] Inventor: Francois X. Bertaud, Aurora, Ill.
[73] Assignee: Borg-Warner Corporation, Chicago, Ill.
[22] Filed: Dec. 26, 1972
[21] Appl. No.: 318,057

Related U.S. Application Data
[63] Continuation of Ser. No. 102,490, Dec. 29, 1970, abandoned.

[52] U.S. Cl. .................................. 184/7 R, 308/20
[51] Int. Cl. ............................................. F16c 13/00
[58] Field of Search ..... 308/20, 187; 184/6 R, 6.11, 184/61, 63

[56] References Cited
UNITED STATES PATENTS

| 3,326,423 | 6/1967 | Clark | 184/7 R X |
| 3,070,219 | 12/1962 | Donadio | 184/6 R |
| 2,671,701 | 3/1954 | Duncan | 308/20 |
| 3,332,536 | 7/1967 | Ebly et al | 308/20 X |
| 3,489,468 | 1/1970 | Buck | 308/20 |
| 3,406,438 | 10/1968 | Reilly | 308/20 X |
| 3,065,822 | 11/1962 | McAfee et al. | 184/11 R |
| 3,522,740 | 8/1970 | Hynes et al. | 184/63 X |

FOREIGN PATENTS OR APPLICATIONS

| 554,976 | 3/1958 | Canada | 308/20 |
| 6,923,864 | 2/1970 | Germany | |

Primary Examiner—Manuel A. Antonakas
Attorney, Agent, or Firm—Donald W. Banner

[57] ABSTRACT

In an assembly having a hollow shaft or spindle and means mounted on the shaft by anti-friction bearings, lubricant for the bearings is supplied through the shaft. Means are provided to establish a pressure drop between the interior of the shaft and each of the bearings, the established pressure drop having a magnitude in excess of the pressure drop existing between the ends of the shaft to insure substantially simultaneous lubrication of each of the bearings.

27 Claims, 8 Drawing Figures

PATENTED MAR 19 1974 3,797,609
SHEET 2 OF 3
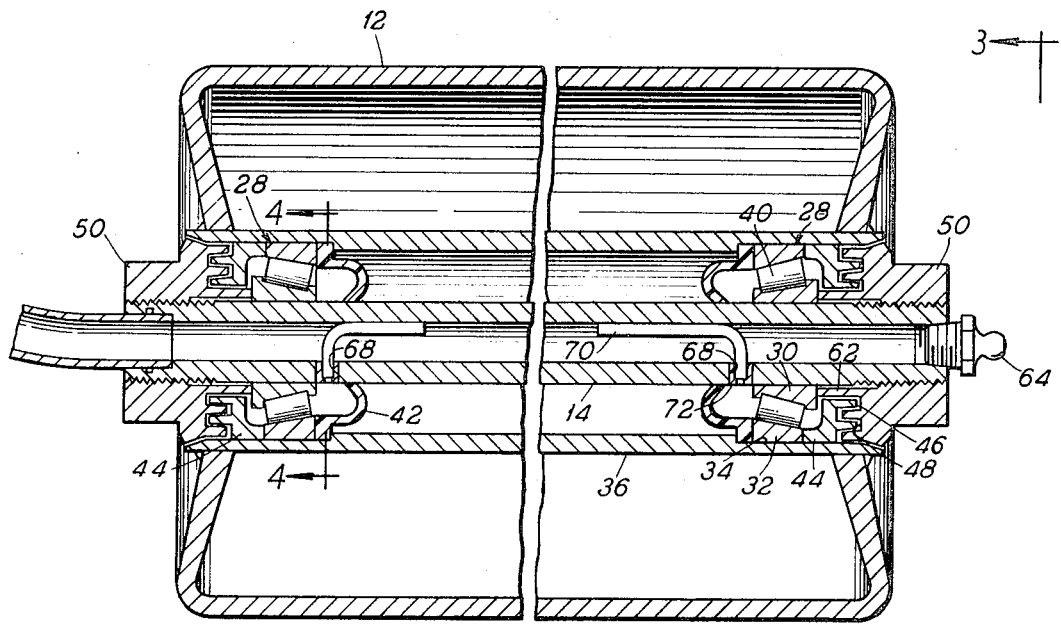
Fig. 2
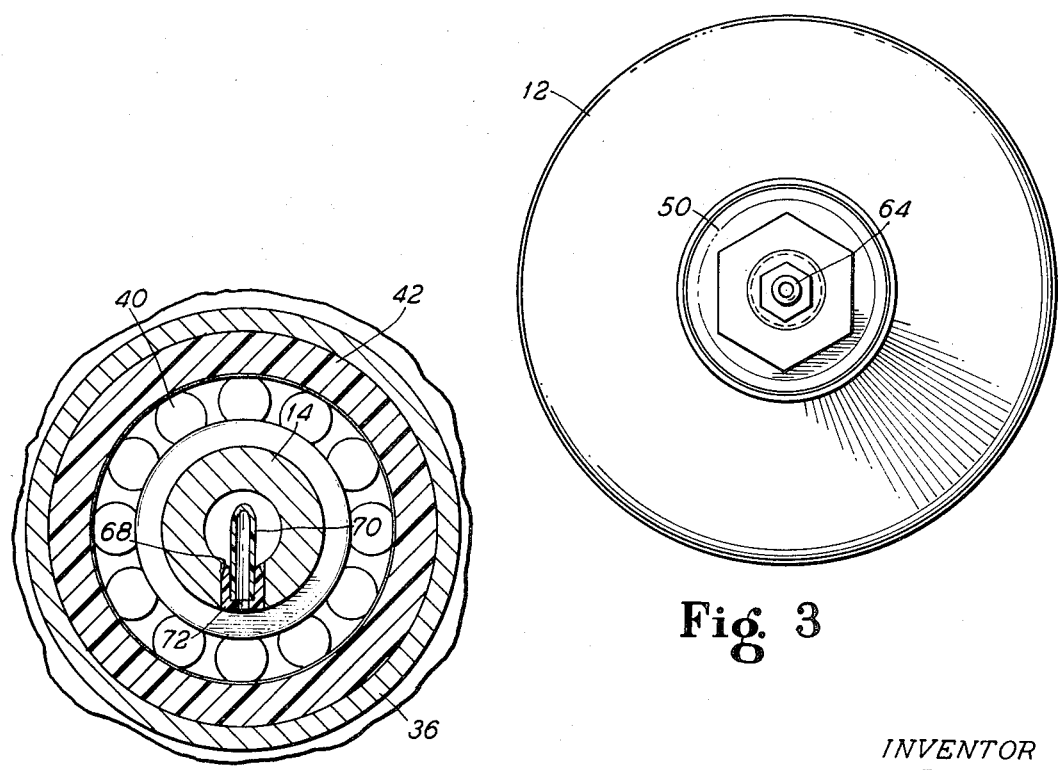
Fig. 4
Fig. 3
INVENTOR
Francois X. Bertaud
BY
Aubrey L. Burgen INVENTOR
Francois X. Bertaud
BY Aubrey L. Burgess

LUBRICATING METHOD AND APPARATUS

This is a continuation, of application Ser. No. 102,490 filed 12/29/70 and now abandoned.

BACKGROUND OF THE INVENTION

Many conveyors have idlers, or the like, mounted on a hollow spindle or shaft by anti-friction bearings, such as roller or ball bearings. Generally, the bearings must be lubricated and it is common practice to supply lubricant through the shaft or through separate conduits to each bearing. When the lubricant is supplied to the spindle, a lubrication fitting is provided at one end of the spindle and a pressure relief fitting is provided at the other end thereof. In this arrangement, the spindle may be provided with openings through the walls which communicate with the bearings to permit the passage of lubricant from the interior of the spindle to the bearings. As lubricant is supplied to one end of the spindle assembly, the amount of lubricant which each bearing receives depends on the resistance to flow which the lubricant encounters between the single lubricating fitting and each bearing. The closer the bearing is to the fitting, the more lubricant it will receive, so that most, or all, of the lubricant will go to the first bearings encountered by the lubricant in its path from the lubricating end of the idler assembly to the other end thereof. This is especially true when the bearing seals are not tight, a desirable feature because purging of the bearings is then achieved. The bearings furtherest from the fitting receive little or no lubricant, shortening their life and requiring frequent service or replacement.

When separate conduits are used, each conduit must be provided with a lubricating fitting. The number of fittings depends upon the number of bearings. The cost of such an arrangement increases as the number of bearings increase, and also, as the size of the installation increases. In the event that a workman misses applying the lubricant at the fitting, the particular bearing can fail.

THE INVENTION

The internal diameter of a hollow spindle to which lubricant is supplied to supply lubricant through transversal holes or openings to anti-friction bearings which are mounted thereon, is small compared to its length. This is true whether the spindle is of one piece or of multiple piece construction. When the generally high viscosity lubricant, such as grease, is introduced at the lubrication fitting at one end into the spindle, there exists a substantial pressure drop between the lubrication fitting and the other end of the spindle. This pressure drop, in most cases, exceeds the pressure required to force the grease through the spindle transversal holes to the bearings and to the outside thereof through the outer seal of each bearing. The bearing seals are preferably designed to permit the passage of grease therethrough, so as to bring fresh lubricant to the bearing and to flush out contaminated lubricant. The tighter the seal, the more friction is developed, which is not a desirable situation.

In order to secure a positive pressure along the length of the spindle (and thus to each opening to a bearing), a pressure drop many times higher than that encountered by the lubricant from the lubrication end of the spindle to the other end must be created at the connection of each bearing with the spindle. By many times higher, it is meant that the pressure drop between one end of the spindle and the other be negligible compared to that created at each bearing cavity connection with the spindle so that each bearing will receive a sufficient quantity of lubricant substantially simultaneously and, desirably, that approximately the same amount of lubricant will flow through each bearing cavity connection with the spindle. Various means of creating the desirable pressure drop can be used. For example, small, able pressure drop can be used. For example, small, spring loaded ball or poppet type valves can be inserted at each connection. However, if there is foreign matter in the lubricant, the moving parts are liable to jam and require cleaning, so that a severe service problem may be created.

The most desirable way to establish the desired pressure drop is to insert and secure a small diameter tube in each opening from the spindle to the bearing and to extend the tube into the spindle. In most applications, a small tube of polyurethene has proved to be successful; such tubing is flexible and is not affected by the lubricant with which it is associated. This construction draws its merits from its easy fabrication and assembly, the lack of moving parts, and also from the fact that adjustment to various viscosities of lubricant and to various outer seal configurations can be achieved merely by varying the length of the pressure drop compensating tube. To achieve substantially equal distribution of lubricant to each bearing of the assembly merely requires the choice of tube lengths which may differ from one end of the spindle to the other or if in some cases may be substantially equal in length.

This invention finds application in the conveying industry, being especially applicable to belt conveyors on which idlers are mounted on a spindle, or on other types of conveyors in which various rotating supporting means are so mounted. However, the invention can be used in other apparatus where the problem of lubrication exists.

THE DRAWINGS

FIG. 2 is an enlarged partial sectional view of a bearing assembly as constructed in accordance with one embodiment of this invention;

FIG. 3 is a view taken on line 3—3 of FIG. 2;

FIG. 4 is a sectional view taken on line 4—4 of FIG. 2;

DETAILED DESCRIPTION

Figure 1:
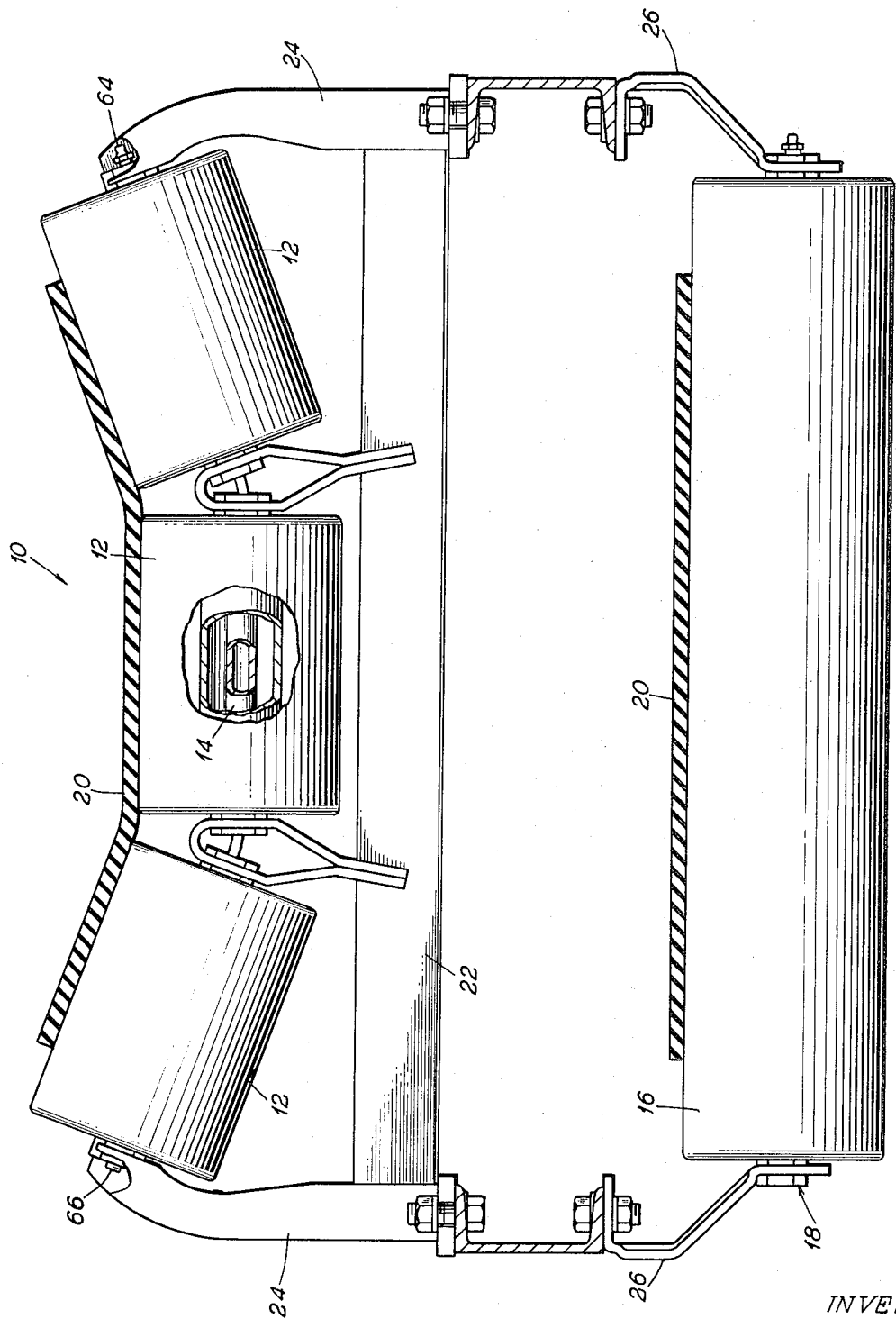
FIG. 1 is a side view of a typical multi-roller assembly for a belt conveyor with parts broken away to show lubricating fitting at one end of each spindle and a plug at the other end thereof.

While there are many arrangements in which this invention can be used, it will be described herein with reference to a multi-roll idler assembly for a belt conveyor. Looking at FIG. 1 of the drawing, there is illustrated a typical multi-roll idler assembly 10 for a belt conveyor which comprises three rolls or idlers 12 each mounted for rotation on a fixed tubular spindle assembly 14. The spindle assembly may be composed of three sections suitably joined together or may be a unitary structure. In any event, the assembly 10, as illustrated, is troughed, i.e., the axis of the outermost rolls 12 are angled with respect to the axis of the center roll 12. The rolls could be coaxial, if so desired. In such an assembly, a return roll or idler 16, mounted on a similar spindle 18, is positioned below the troughed idler assembly. The idler 10 supports a belt 20, as shown.

The idler assembly 10 is suitably supported by a base 22 and brackets 24. Brackets 26 support the return idler 16, as illustrated.

Each roll 12 is rotatably mounted on the spindle by at least a pair of spaced anti-friction bearing means, generally identified as 28, such as illustrated in FIG. 2.

The anti-friction means 28, shown here for purposes of illustration as a roller bearing assembly, has an inner race 30 fixed or otherwise secured to the spindle 14 and an outer race 32 fixed or otherwise secured in a recess 34 in an inner tube 36 of the idler 12. Rollers 40 are disposed between the races 30 and 32. To seal the bearings 28 from foreign matter, there is provided a grease retainer or inner seal 42 which abuts the outer race 32, wipes the spindle 14 and is retained in the recess 34.

An outer seal 44 is also provided which comprises a circular member fixed to the inner tube 36, having a flange engaging the outer race 32 and a plurality of circular projections 46 complementary to circular grooves 48 in a fixed outer member 50 having threaded engagement with the spindle 14. The member 50 has an inwardly directed flange 62 engaging the inner race 30.

To lubricate the bearings 28, a lubricant, such as grease, is forced through the spindle 14. To accomplish this, a lubrication fitting 64 is connected on one end of the spindle 14 and a plug 66 (see FIG. 1) is connected to the other end thereof, or a lubrication fitting is connected to both ends. Openings 68 are provided in the spindle which communicate the interior of the spindle with the bearings 28. A tube 70 is sealed in each opening 68 and extends into the interior of the spindle 14. For ease of manufacture, the openings 68 are drilled or punched at right angles to the axis of the spindle 14; however, the openings 68 can be angled, if so desired. The length of each tube 70 is chosen to provide the desired pressure drop between the spindle and the bearing. With the bearing assembly just described, lubricant flows through the spindle, through the tubes 70, through the bearing and can flow out of the bearing through the spaces between the member 44 and the outer member 50, providing lubrication for the bearing, purging the bearing of contaminated lubricant, and insuring fresh lubricant flow to rollers 40.

Figure 8:
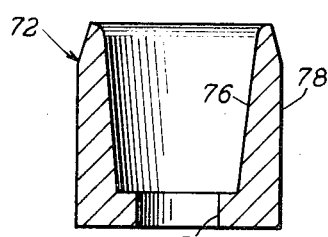
FIG. 8 is an enlarged sectional view of an insert as shown in FIG. 7.
Figure 6:
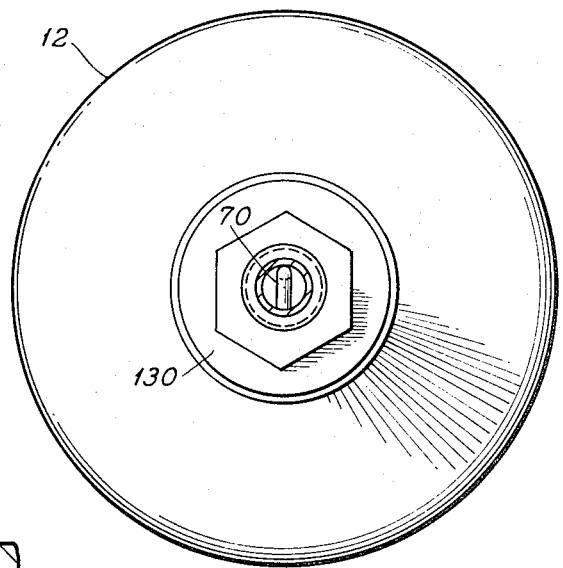
FIG. 6 is a view taken on line 6—6 of FIG. 5.
Figure 7:
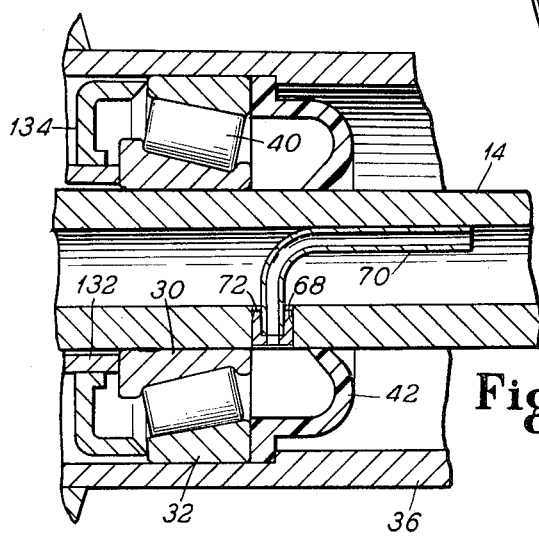
FIG. 7 is an enlarged partial sectional view of a typical spindle and illustrating one method by which the pressure compensating tube of this invention is maintained in position therein.

To retain the tubes 70 in their openings, a locking insert 72 see (FIGS. 7 and 8) is employed. Each insert is a substantially cup shaped member having a central opening 74. The interior and exterior walls, 76 and 78 respectively, are tapered so as to frictionally engage a tube 70 and openings 68. Each opening may be peened over to assist in retaining the insert, if desired.

Figure 5:
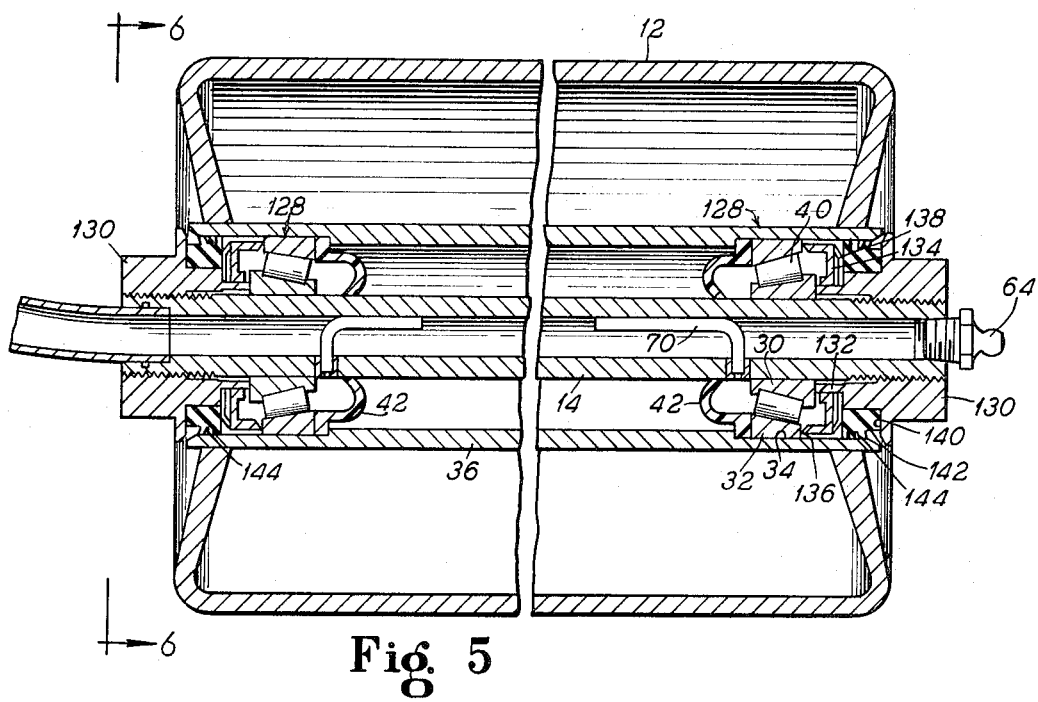
FIG. 5 is a view similar to FIG. 2 but showing another embodiment of this invention.

Another form of a bearing assembly identified as 128 and illustrated in FIG. 5, can be used if desired. This assembly in which like reference numbers are used to identify like parts, comprises the inner race 30 fixed or otherwise secured to the spindle 14 and the outer race 32 fixed or otherwise secured in the recess 34 in the inner tube 36 of the idlers 12. Rollers 40 are disposed between the races 30 and 32. To seal the bearings from foreign matter, there is provided the inner seal 42, as previously described.

The major difference between the bearings 28 and 128 is the outer seal which comprises an outer seal member 130, threadably received on the spindle 14 with a circular flange 132 abutting the inner race 30. The flange 132 supports a flanged seal member 134 having line contact, as at 136, with the outer race 32. In order to maintain the contact at 136, a circular spring or Belleville washer 138 is placed between the seal 130 and the member 134. The seal member 130 is recessed at 140 to receive a flexible sealing ring 142, constructed of rubber, neoprene, or the like, which sweeps against the inner periphery of the inner tube 36. The ring 142 is grooved, as at 144, to enhance the flexibility of its outer periphery.

To lubricate the bearing 128, an opening is provided in the spindle 14 and the tube 70, as in the previous embodiment, is provided. Excess pressure of lubricant will flex the sealing member 142 and permit the passage and purging of lubricant from the bearing.

In each of the embodiments described, the length of the tube 72 is chosen to provide the desired pressure drop, and the inner diameter is such to permit the passage of the usual contaminants in lubricating grease used for this purpose.

At times, inner tubes such as those identified in 36 are not used; however, this does not affect the essence of the invention, in that bearings for such idlers can be lubricated in the same manner as described.

To illustrate the advantages of this invention, three tests will be described. These tests were conducted with the elements of a three roller idler used with a 60 inch wide conveying belt. Each test used a composite shaft constructed of three three-fourths inch O.D., 0.195 inch wall thickness shafts, each shaft being 22-7/16 inches long and spaced 1-¾ inches apart. The three shafts were connected in series by ⅜ inch O.D., ¼ inch I.D., 2-¾ inches long flexible connectors. The connectors projected approximately ½ inch inside the connected hollow shafts. A lubricating fitting was provided at each end of the composite shaft. Before assembly, each shaft and connector was filled with lubricant. Lubricant was introduced in the assembly at one lubrication fitting by means of a hand operated grease gun. The same lubricant was used in each test.

In Test A, six 1/16 inch openings, each spaced 1-⅞ inches from the ends of a shaft were used. In tests B and C a ⅛ inch O.D., 1/16 inch I.D. compensating tube was used at each opening, spaced the same distance from the ends of the shafts.

The lubricant flowing through each opening was measured and converted into terms of the total lubricant introduced into the assembly. In each test the opening closest to the lubrication fitting on which lubricant was introduced is noted as 1. The most distant is noted as 6.

TEST A
Opening 1 2 3 4 5 6
% of Total 82.2 15.3 2.5 0 0 0
TEST B
Opening 1 2 3 4 5 6
Lengh of Tube in inches 5-⅜ 5-¼ 4-½ 4-¼ 3-½ 3-⅜

% of Total 20.7 19.7 17.6 15.4 13.8 12.8
TEST C - Compensating Tube 9 inches in length
Opening 1 2 3 4 5 6
% of Total 23.5 23.5 17.3 17.3 9.2 9.2

I claim:

1. In an idler assembly especially adaptable for belt conveyors having at least one roll mounted on a tubular spindle by anti-friction bearings, the spindle being apertured to provide access to the bearings and having at least one lubricating fitting at one end thereof communicating with said spindle for supplying lubricant to said spindle and then to said bearings through said openings, the improvement which comprises;

a tubular member extending into each of said openings and into the spindle to establish a pressure drop between the spindle and each bearing of a magnitude above that existing between the ends of the spindle to insure the passage of lubricant from said tubular spindle to each of said bearings.

2. In an idler assembly as recited in claim 1, wherein the cross-section of each of said tubes is small as compared to the length thereof.

3. In an idler assembly as recited in claim 1, wherein the internal diameter of each of said tubes is sufficient to permit the passage of foreign matter in the lubricant flowing therethrough.

4. In an idler assembly as recited in claim 1, further including a lubricating fitting at each end of said spindle.

5. In an idler assembly as recited in claim 1, wherein said bearings are constructed to permit the passage of lubricant therethrough providing a purge of lubricant in each bearing.

6. In an idler assembly as recited in claim 1, wherein said spindle is constructed of multiple sections joined together.

7. In an idler assembly as recited in claim 1, wherein said spindle is constructed of a single tubular member.

8. In an assembly comprising a hollow shaft having at least a pair of bearings mounted thereon, said shaft being provided with at least one lubrication fitting for supplying lubricant thereto and being provided with openings therethrough communicating with said bearings for the passage of lubricant to each bearing, the improvement comprising;

a tubular member extending into each opening and into said shaft for the passage of lubricant therethrough, said tubular member being of such length to insure a pressure drop between the shaft and the bearings of a magnitude above that existing in said shaft between the ends thereof to insure the passage of lubricant to each of said bearings.

9. In an idler assembly especially adaptable for belt conveyors having at least one roll mounted on a tubular spindle by anti-friction bearings, the spindle being apertured to provide access to the bearings and having at least one lubricating fitting at one end thereof communicating with said spindle for supplying lubricant to said spindle and then to said bearings through said openings, the improvement which comprises;

a tubular member extending into each of said openings and into the spindle to insure the passage of lubricant from said tubular spindle to each of said bearings.

10. In an idler assembly as recited in claim 9, wherein the passage of lubricant is substantially simultaneous to each bearing.

11. In an idler assembly especially adaptable for belt conveyors having at least one roll mounted on a tubular spindle by anti-friction bearings, the spindle being apertured to provide an access to each bearing and having at least one lubricating fitting at one end thereof communicating with said spindle for supplying lubricant to said spindle and then to said bearings through said openings, the improvement which comprises;

a tubular member extending into each of said openings and into the spindle to establish a substantially uniform pressure drop between the spindle and each bearing of a magnitude above that existing between the ends of the spindle to insure the passage of lubricant from said tubular spindle to each of said bearings.

12. In an idler assembly as recited in claim 11 wherein the cross-section of each of said tubes is small as compared to the length thereof.

13. In an idler assembly as recited in claim 11, wherein the internal diameter of each of said tubes is sufficient to permit the passage of foreign matter in the lubricant flowing therethrough.

14. In an idler assembly as recited in claim 12 in which said tubular members are of different lengths.

15. In an idler assembly as recited in claim 12, further including a lubricating fitting at each end of said spindle.

16. In an idler assembly as recited in claim 12, wherein said bearings are constructed to permit the passage of lubricant therethrough providing a purge of lubricant in each bearing.

17. In an assembly comprising a hollow shaft having at least a pair of bearings mounted thereon, said shaft being provided with at least one lubrication fitting for supplying lubricant thereto and being provided with openings therethrough communicating with said bearings for the passage of lubricant to each bearing, the improvement comprising;

a tubular member extending into each opening and into said shaft for the passage of lubricant therethrough, said tubular member being of such length to insure a substantially uniform pressure drop between the shaft and each bearing of a magnitude above that existing in said shaft between the ends thereof to insure the passage of lubricant to each of said bearings.

18. In an idler assembly especially adaptable for belt conveyors having at least one roll mounted on a tubular spindle by anti-friction bearings, the spindle being apertured adjacent to that bearing to provide access to each bearing and having at least one lubricating fitting at one end thereof communicating with said spindle for supplying lubricant to said spindle and then to each bearing through the adjacent opening, the improvement which comprises;

a tubular member extending into each opening and into the spindle to insure substantially uniform passage of lubricant from said tubular spindle to each bearing.

19. In an idler assembly as recited in claim 18, wherein the passage of lubricant is substantially simultaneous to each bearing.

20. In an idler assembly as recited in claim 18 wherein the length of each tubular member is of different length.

21. A lubrication system comprising;
a hollow shaft;
a plurality of bearings mounted on the shaft;
an opening in said shaft communicating with each bearing;
means in the shaft associated with each opening to establish a pressure drop between each bearing and the shaft of like magnitude and greater than that existing between the ends of the shaft; and
means to supply lubricant to said shaft and through said associated means to said bearings, said established pressure drop insuring the passage of substantially equal amounts of lubricant to each bearing.

22. A lubrication system as recited in claim 21 wherein said lubricant is supplied substantially simultaneously to each bearing.

23. In a method of lubricating bearings associated with a hollow shaft to which lubricant is supplied, said shaft having an opening to each bearing through which lubricant can flow to each bearing, the improvement which comprises;
modifying the normally existing pressure relationship between the interior of the shaft and each bearing by inserting a means in each opening to establish a pressure drop between the interior of the shaft and each bearing of a magnitude above that existing between the ends of the shaft, and
supplying lubricant to the interior of the shaft and through said means to each bearing.

24. In a method of lubricating bearings associated with a hollow shaft to which lubricant is supplied, said shaft having an opening to each bearing through which lubricant can flow to each bearing, the improvement which comprises:
modifying the normally existing pressure relationship between the interior of the shaft and each bearing by inserting a means in each opening to establish a substantially uniform pressure drop between the interior of the shaft and each bearing of a magnitude above that existing between the ends of the shaft; and
supplying lubricant to the interior of the shaft and through said means substantially uniformly to each bearing.

25. A method as recited in claim 24 further comprising supplying said lubricant to each bearing substantially simultaneously.

26. A belt conveyor apparatus comprising
a belt
an idler assembly for supporting said belt,
said idler assembly comprising a plurality of rolls mounted at angles with regard to each other and on a tubular spindle by anti-friction bearings at least at their opposite ends,
said spindle being apertured to provide access to each of the bearings and having a lubrication fitting at one end communicating with the interior thereof for supplying lubricant to said spindle and to each bearing through said openings,
the improvement comprising,
a tubular member extending into each of said openings and into the interior of the spindle for the passage of said lubricant to the respective bearing.

27. A belt conveyor apparatus as recited in claim 26, wherein each of said tubular members is of a different length.

* * * * *

UNITED STATES PATENT OFFICE
CERTIFICATE OF CORRECTION

Patent No. 3,797,609         Dated March 19, 1974

Inventor(s) Francois X. Bertaud

It is certified that error appears in the above-identified patent and that said Letters Patent are hereby corrected as shown below:

Column 6, Claim 14, line 27, "12" should be --- 11 ---;

Claim 15, line 29, "12" should be --- 11 ---;

Claim 16, line 32, "12" should be --- 11 ---;

Column 7, Claim 20, line 2, after "of" (second occurrence) insert --- a ---.

Signed and sealed this 15th day of October 1974.

(SEAL)
Attest:

McCOY M. GIBSON JR.
Attesting Officer

C. MARSHALL DANN
Commissioner of Patents